UNITED STATES PATENT OFFICE.

LUCAS PETRON KYRIAKIDES AND RICHARD BLAIR EARLE, OF BOSTON, MASSACHUSETTS, ASSIGNORS TO HOOD RUBBER COMPANY, OF BOSTON, MASSACHUSETTS, A CORPORATION OF MASSACHUSETTS.

PROCESS OF PRODUCING β γ DIMETHYLBUTADIENE 1.3.

1,033,328. Specification of Letters Patent. Patented July 23, 1912.

No Drawing. Application filed November 11, 1911. Serial No. 659,823.

*To all whom it may concern:*

Be it known that we, LUCAS P. KYRIAKIDES and RICHARD B. EARLE, citizens of the United States, residing at Boston, Massachusetts, have invented certain new and useful Improvements in Processes for Producing β γ Dimethylbutadiene 1.3, of which the following is a specification.

Our invention relates to a new and valuable process for producing β γ dimethylbutadiene,

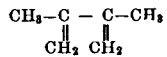

which is a valuable hydrocarbon used for the production of rubber like substances.

The new process consists in passing the vapors of hexylene oxid of the formula:

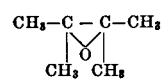

over dehydrating catalytics such as aluminum silicate at temperatures ranging from 400°–500° C., and pressures less than 60 millimeters of mercury.

The reaction consists of the splitting off of water according to the equation:

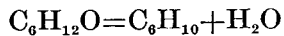

In order to illustrate the process more fully the following example is given. The hexylene oxid is distilled slowly over aluminum silicate, either powdered or in briquet form, the pressure being reduced to one millimeter of mercury by a vacuum pump and the alumi_ _ silicate being kept at a temperature of 450° C. The products of the reaction are condensed in suitable receivers by means of refrigerating agents and purified by distillation. The yield is about 80% of the theory.

We claim:

1. The process for producing β γ dimethylbutadiene which consists in passing the vapors of the hexylene oxid of the formula:

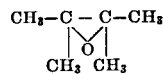

over heated dehydrating catalytics at temperatures from 400°–500° C., *in vacuo*, at pressures less than 60 millimeters of mercury.

2. The process for producing β γ dimethylbutadiene which consists in passing the vapors of the hexylene oxid of the formula:

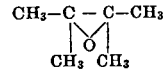

over heated aluminum silicate at temperatures from 400°–500° C., *in vacuo*, at pressures less than 60 millimeters of mercury.

In testimony whereof, we affix our signatures in presence of two witnesses.

LUCAS PETRON KYRIAKIDES.
RICHARD BLAIR EARLE.

Witnesses:
 JESSIE R. MOTT,
 M. ALICE HAGARTY.